March 29, 1966  G. J. TRUSOCK  3,243,194
ENTRY WHEEL ARRANGEMENT FOR PALLET TRUCK
Filed April 1, 1964  3 Sheets-Sheet 1
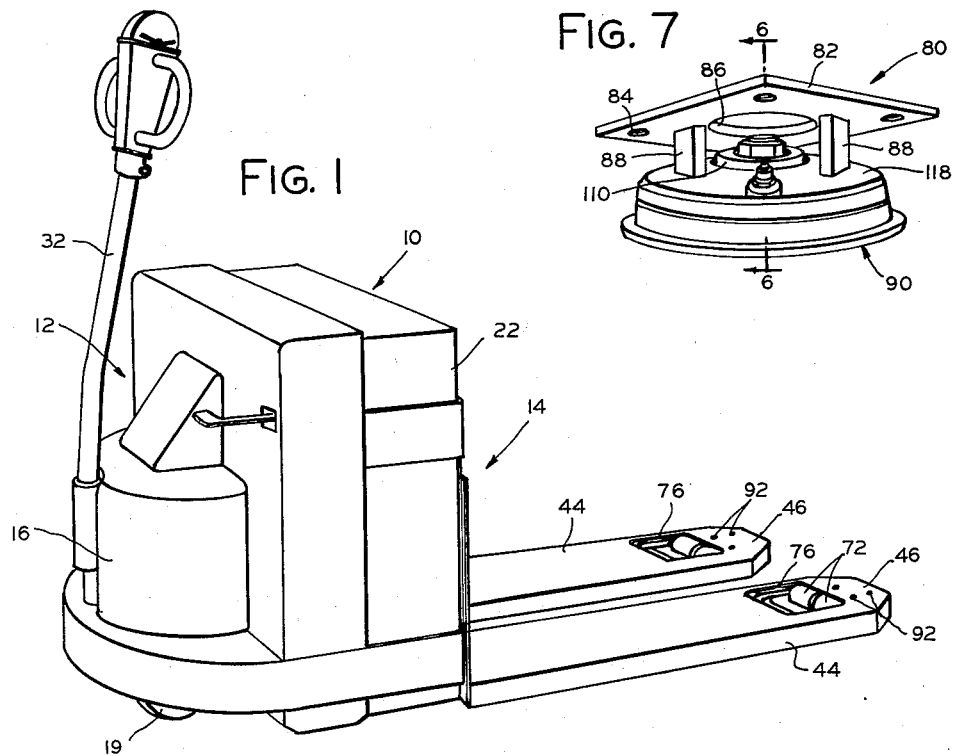
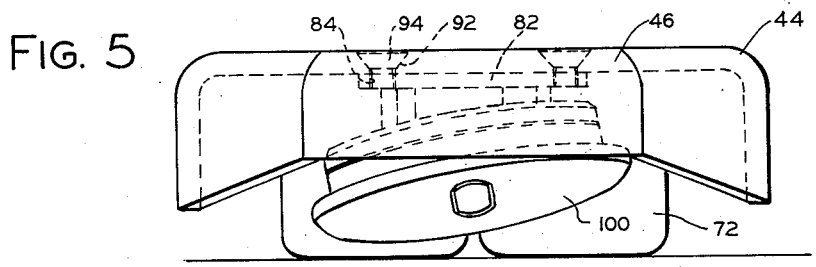
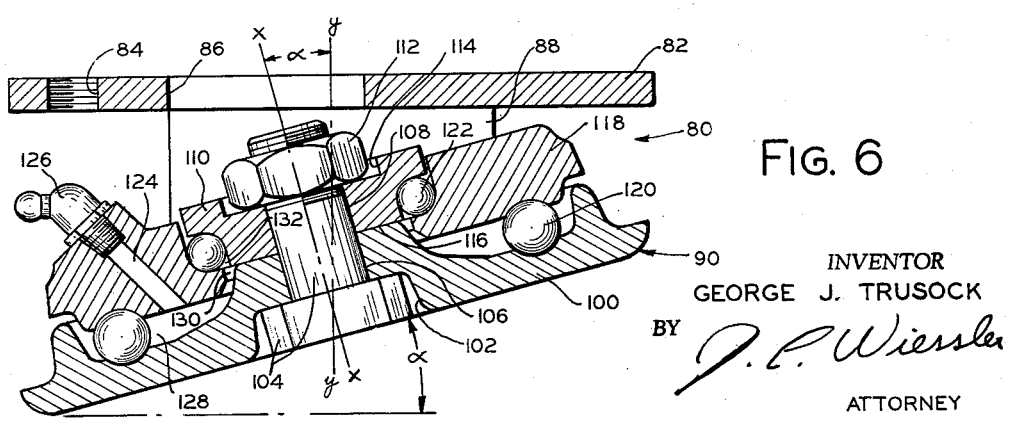
INVENTOR
GEORGE J. TRUSOCK
BY
ATTORNEY March 29, 1966 G. J. TRUSOCK 3,243,194
ENTRY WHEEL ARRANGEMENT FOR PALLET TRUCK
Filed April 1, 1964 3 Sheets-Sheet 2
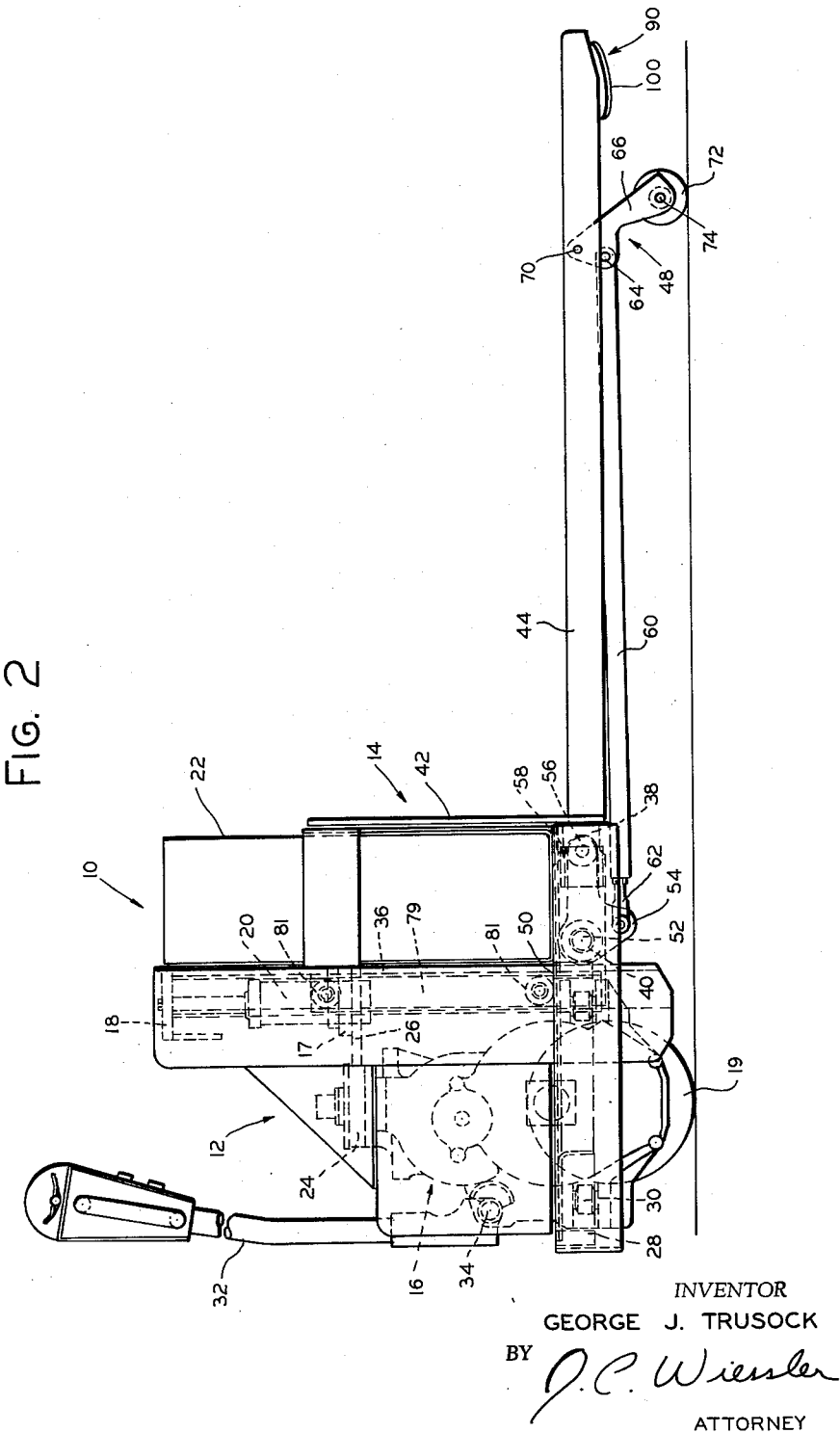
*INVENTOR*
GEORGE J. TRUSOCK
BY
ATTORNEY March 29, 1966     G. J. TRUSOCK     3,243,194
ENTRY WHEEL ARRANGEMENT FOR PALLET TRUCK
Filed April 1, 1964     3 Sheets-Sheet 3

INVENTOR
GEORGE J. TRUSOCK
BY
ATTORNEY

United States Patent Office 3,243,194
Patented Mar. 29, 1966

3,243,194
ENTRY WHEEL ARRANGEMENT FOR PALLET TRUCK
George J. Trusock, Battle Creek, Mich., assignor to Clark Equipment Company, a Michigan corporation
Filed Apr. 1, 1964, Ser. No. 356,370
15 Claims. (Cl. 280—43.12)

This invention relates to pedestrian type lift trucks of the type used for lifting loaded pallets or skids and transporting them from place to place, and more particularly is directed to improvements for facilitating movement of the truck frame to an operative lifting position relative to a pallet.

The frame portion of a pallet handling lift truck has a fork shape providing a pair of spaced rearwardly extending arms which are inserted in the space between the upper and lower platforms of material handling pallets or skids preparatory to lifting the same. The frame is normally supported for rolling movement over a floor area by a relatively large drive-steer wheel at the forward end thereof and by relatively small trail wheels or rollers at the rear ends of the fork arms which are extensibly mounted with rsepect to the frame by supporting brackets pivoted to the frame. After movement of the fork arms to an operative position between the upper and lower pallet platforms, pivotal movement of the supporting brackets raises the fork arms of the truck frame into engagement with the underside of the upper pallet platform and elevates the pallet so that it may be transported by the truck.

Since the fork arms of the truck must be inserted in the relatively narrow space between the upper and lower pallet platforms, the extensible rollers at the rear ends of the truck fork arms of necessity have a small diameter which interferes seriously with rolling movement thereof over obstructions in the path of movement of the truck. The lower pallet platform constitutes an obstruction to the rolling movement of these extensible rollers, and the difficulty in entering the fork arms between the upper and lower pallet platforms is increased when the platforms are constructed of spaced parallel wood slats since the extensible rollers, without more, drop into the space between adjacent slats whenever they move over one of the slats so that each of the slats becomes an obstruction over which the extensible roller must move.

To facilitate entry of the truck fork arms into the space between the pallet platforms, various proposals have been made for elevating the rear ends of such arms and the extensibly mounted rollers carried thereby with respect to obstructions an amount such that the rollers will more readily move over such obstructions. However, this seemingly simple problem has heretofore defined adequate solution despite the fact that the problem has plagued the pallet truck industry for many years.

One proposed solution involves the use of a series of auxiliary rollers mounted at different levels, or being of different diameters, and located rearwardly of the extensible truck rollers, such as is disclosed in U.S. Patents 2,234,925, dated March 11, 1941, and 2,274,164, dated February 24, 1942. Another proposal for the same purpose comprises a camming member mounted rearwardly of the extensible rollers, such as is disclosed in U.S. Patent 2,498,504. Still another proposal is disclosed in U.S. Patent 2,727,752, dated December 20, 1955, wherein an elongated roller is mounted rearwardly of the extensible rollers on each fork arm and extends angularly with respect to the horizontal center line of the fork arm on which it is mounted, having a line of contact on its lower surface which slopes downwardly from the rear to the front with respect to the fork arm. The rollers are mounted so that the axes of rotation converge toward the rear of the truck, and pallet entry is facilitated by a combined rolling and sliding action along the rollers and over the upper surface of the lower pallet platform. Functionally, the inclined tapered rollers of the latter patent are equivalent to the use of a large number of auxiliary rollers mounted rearwardly of the extensible rollers which increase slightly in diameter from the rearwardmost to the forwardmost of such auxiliary rollers. The latter patent also combines the function of the camming action of above-mentioned Patent 2,498,504 with a multiple small roller action, as above-mentioned, in facilitating the resultant combined rolling and sliding action across the periphery of the tapered roller. Yet another proposal disclosed in U.S. Patent 2,993,703, dated July 25, 1961, wherein a camming member is utilized, such as in Patent 2,498,504, in combination with a disc-like wheel having a diameter the same as the diameter of the extensible or lifting wheel. The disc-like wheel is mounted rearwardly of the extensible wheel on laterally inclined axes so as to afford in effect an inclined rolling surface of somewhat less slope than previously for facilitating the entry of the extensible rollers over the lower pallet platform in combination with the sliding movement of the camming member over the lower pallet platform.

Although some of the foregoing exemplary proposals have afforded partial solutions to the problem at hand, none have been found suitable or adequate to accommodate all pallet entry problems. Many problems must be recognized and solutions thereof effected in order to arrive at a design which is universally applicable in this area. For example, industry uses pallet constructions in which the lower platform or boards vary in thickness from approximately ⅜" to 1¼", both rough-cut and finished type boards being used in different applications, with or without chamfered edges, for use on rough or smooth floors, and of a weight which varies considerably from one pallet construction to another. In addition, some warehousing and factory operations stack palletized materials in relatively closely spaced rows which require that the fork arms of a pallet truck enter the pallet at a relatively sharp approach angle as a result of the small turning radius which is available between the rows of palletized material. Prior art constructions require that the fork arms of the pallet truck enter the pallet in substantially straight-line alignment with the pallet because of the inability of such devices to properly engage the lower pallet platform at a substantial angle and lift the extensible rollers into the pocket of a pallet.

When entering a pallet it is extremely important to provide as large an effective rolling radius as is possible in order to transfer the weight from the end of the fork arms over the lower pallet platform with a minimum of horizontal force and a maximum of vertical force, thus tending to hold the pallet down on the floor without skidding it ahead of the fork arms. The tendency of unloaded pallets, particularly those of lightweight construction and when used on smooth floors, to skid along the floor ahead of the pallet truck during attempts to engage the pallet has been a very serious problem, and results from the relatively large horizontal force which is imposed on the lower pallet platform by prior art devices during pallet entry operations. Furthermore, prior art devices are generally incapable of handling different pallets having lower platforms which vary substantially in thickness without adjustments being made in the pallet entry device or the providing or various designs of pallet entry devices.

I have devised a pallet entry construction which solves in an extremely satisfactory manner the many pallet entry problems heretofore encountered in various industrial and warehousing applications. In carrying out my invention I have provided a large pallet entry disc-like element having a diameter which is substantially larger than the diameter of the associated extensible wheels, and which is mounted in a novel bearing construction which supports the outer peripheral portion of the disc-like element in order to minimize shock loading on the disc during pallet entry operations. The disc and bearing are mounted at a compound angle rearwardly of the extensible wheels in each fork arm, which angle is inclined both longitudinally and transversely of the fork arm such that a relatively large effective rolling radius over the edge of a lower pallet platform results which has the same effect as would the use of an extremely large pallet entry wheel to effect during movement over pallet boards a large vertical to horizontal force ratio acting on the pallet platform during transfer of the weight of the fork arms from the floor to the pallet platform. The disc-like element is sufficiently large in diameter so that it is capable of smoothly entering pallets without vertical adjustment of the disc in situations wherein the bottom plaform boards of the pallet vary in thickness from as little as ⅜" to as much as 1¼", and regardless of whether the pallet is of rough cut or finished construction, with or without chamfered edges, of relatively light or heavy weight, and regardless of whether it is used in areas having rough or smooth floors, all without undue wear of the lower pallet platform and without skidding of the pallet across the floor during entry of the fork arms between the upper and lower pallet platforms. My device is also capable of entering pallets of such variable designs as mentioned above from a relatively sharp angle without skidding of the pallet. In addition, the present invention eliminates the necessity for the use of camming devices on the side of the fork arms, alone or in combination with wheels, rollers or relatively small discs, thus not only reducing the number of parts and the over-all cost of the unit, but further insuring that pallet entry will not be made difficult as a result of the tendency of empty pallets to skid ahead of the truck because of the relatively large horizontal forces imposed upon the pallet by such camming devices.

The difficulty of the problems heretofore unsolved in the design of a universally applicable pallet entry device may be better appreciated when it is realized that such devices must be capable of being installed and used in a space at the rear end of the fork arms which is approximately 3" in height, 7" in width, and 6" in length, in accordance with present industrial uses of pallet trucks. Such space limitations as are imposed on designers of pallet entry devices have heretofore been primarily responsible for the previous inability of inventors to devise a universally applicable pallet entry structure which solves the problems encountered in the use of such devices, as discussed above. My invention provides such a device.

It is therefore a principal object of the present invention to provide a pallet entry device for use with pallet trucks which is capable, without adjustment, of efficiently effecting the entry of the pallet engaging portion of such trucks within the space between upper and lower pallet platforms, regardless of relatively large variations in thickness of the bottom pallet platform.

It is another important object of the present invention to provide an improved pallet entry device for pallet trucks which is capable of effecting the entry of the fork arms of such trucks within pallets from relatively sharp angles as between the pallet and the truck.

It is another object of the invention to provide an improved pallet entry device which effects a transfer of weight from one end of a pallet truck to a lower pallet platform with a relatively small horizontal force being imposed by the pallet entry device on the platform.

Another object of the invention is to provide a pallet entry device which utilizes a disc mounted at a compound inclined angle both longitudinally and transversely of the truck in which the diameter of the disc is substantially larger than the diameter of truck lifting wheels associated therewith, whereby to provide a large rolling radius within a relatively small space.

Another important object of the present invention is to provide a bearing device for large pallet entry discs of the type contemplated in which the bearing device is so constructed and arranged as to reduce to a minimum the cantilever of the peripheral portion of the disc.

Other objects, features and advantages of the invention will appear to persons skilled in the art from the following detailed description of one preferred embodiment thereof, taken in conjunction with the drawings wherein:

FIGURE 1 is a perspective view of a pallet truck;

FIGURE 2 is a side view of the pallet truck shown in FIG. 1 with the lifting wheels shown in an extended position;

FIGURE 5 is a front elevational view of the fork arm shown in FIG. 3;

FIGURE 6 is a cross-sectional view of the pallet entry disc and bearing construction secured to a mounting plate therefor, taken along line 6—6 of FIG. 7 and rotated to the position illustrated; and FIGURE 7 is a perspective view of the pallet entry device per se.

Figure 3:
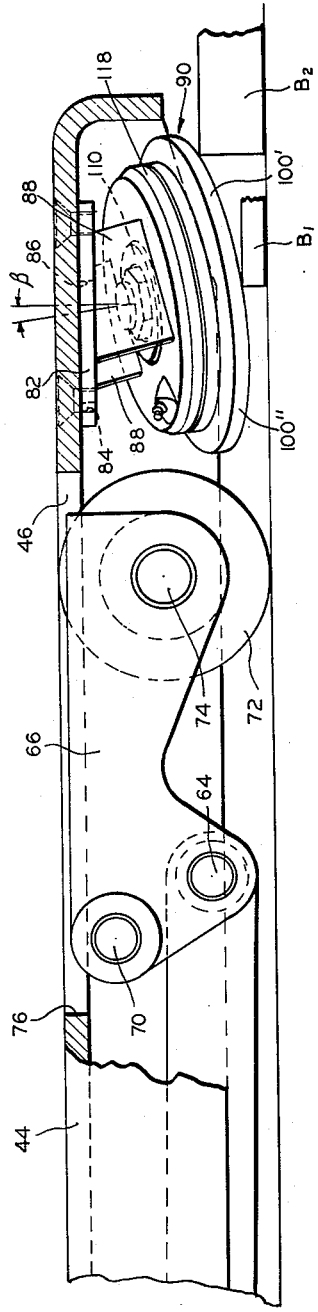
FIGURE 3 is an enlarged broken-away view in partial side section of the rear end portion of the right-hand fork arm shown in FIG. 1.

Referring now to the figures in detail, there is indicated generally by the reference numeral 10 a pallet truck which comprises a reverse L-shaped main frame 12, a rearwardly extending L-shaped load supporting frame 14 having a vertical leg means thereof mounted in telescoping relation to the vertical leg means of main frame 12, said frames 12 and 14 including transverse frame members 17 and 18 having a single, relatively short hydraulic cylinder-piston motor 20 mounted centrally therebetween and extending vertically for elevating frame 14 relative to frame 12.

Rotatably mounted about a vertical axis in the main frame 12 is a drive head unit indicated generally by numeral 16 which is supported on a ground engaging drive-steer wheel 19. Wheel 19 is powered by an electric motor enclosed in the drive head unit and adapted to have driving connection with the drive wheel through suitable gearing, and to have electrical connection with a battery carried by the truck in a battery compartment 22.

The upper end of drive head unit 16 is secured in the inner race of a tapered roller bearing assembly 24, the outer race of which is secured in a horizontal plate member 26 suitably connected to the main frame. The lower end of the drive head unit 16 is supported and guided in a circular ring or track 28 which is secured to the main frame. Four suitably spaced rollers 30 (two being shown) are connected to the drive head unit and engage track 28 such that drive unit 16 and drive wheel 19 may be steered 90° in either direction by a steering and driving operator's control handle assembly 32 which is pivoted to the drive unit 16 by a pin 34, and which is also adapted to control the application of and release of brakes, not shown, associated with drive unit 16.

The load supporting frame 14 includes a pair of vertically extending transversely spaced inwardly opening channel members 36, a pair of forwardly extending transversely spaced frame members 38 having axially aligned openings 40 therein (one of each of which members 36 and 38 is shown), an upstanding transverse plate member 42 connected to the front end of frame members 38, and a pair of forwardly extending, transversely spaced pallet legs 44 located somewhat transversely outwardly of members 38 and secured, as by welding, to the lower corner portions of plate 42. Each pallet leg 44 comprises a generally inverted U-shaped construction having an open frame end portion 46 adapted to receive a lifting wheel and lift lever linkage assembly 48. The load support frame 14 is mounted in relation to main frame 12 such that plate 42 lies immediately rearward of battery compartment 22, members 38 extend forwardly beneath the main frame, and vertical members 36 extend upwardly and forward of battery compartment 22 through openings cut out of a horizontal base plate 50 of the main frame. A plurality of body or cover plate members, as shown in the figures, are connected to each other and to the main frame 12, and cover the drive head assembly 16, frame 12, battery compartment 22 and parts of frame 14.

A transverse torque tube 52 is journaled in openings 40, and supports transversely outwardly of the members 38 a pair of bell crank members 54 keyed to the opposite ends of said torque tube. On the upper end of each bell crank 54 is mounted a roller 56 which is received in a short longitudinally extending and inwardly facing guide track 58 secured to and beneath floor portion 50. A rearwardly extending arm of each bell crank is connected to an elongated pull rod 60 by a threaded link 62. The pull rod extends through and beneath the pocket of each inverted U-shaped leg 44 and is pivotally connected at its rearward end by a pin 64 to a bifurcated lifting lever 66 of each trail wheel assembly 48 which is supported for lifting movement beneath each pallet leg by means of a pivot pin 70 mounted in a pair of openings in the sides of each pallet leg 44. Each lift lever 66 is adapted to mount at its forward end a pair of lifting wheels 72 mounted for rotation on a transverse shaft 74 received in the ends of each bifurcated lever 66, the lifting wheels being adapted to be received in an open pocket portion 76 of each pallet leg when the latter is disposed in a lowered position as shown in FIG. 1.

Secured to and extending upwardly in transverse spaced relation from floor 50 of the main frame is a pair of frame members 79, outwardly of each of which is mounted a pair of upper and lower rollers 81, one pair of which is shown, which engage the channels of inwardly opening channel members 36 to support for vertical movement in main frame 12 the load supporting frame 14. Transverse member 17 extends between and is secured to frame members 79 adjacent upper pair of rollers 81. The piston rod of lift cylinder 20 is secured centrally of plate 18, and when extended as shown in FIG. 2, it actuates channel members 36 upwardly with transverse member 18 and horizontal frame members 38, whereby torque tube 52 is actuated upwardly with frame members 38 which causes bell crank levers 54 to be actuated to the FIG. 2 position in which pull rods 60 are actuated as shown to pivot each lifting lever 66 clockwise about the respective pins 70 thereby elevating in a horizontal plane the fork arms or pallet legs 44 from the FIG. 1 to the FIG. 2 position, in which latter position the pallet truck when engaging the upper platform portion of a pallet, loaded or unloaded, elevates the pallet above floor level for transport to a selected location.

The pallet truck structure described thus far is known, and a similar structure is described in greater detail in copending application Serial No. 180,124, filed March 16, 1962, in the names of the present inventor and Kenneth C. Johnson, jointly (common assignee), now Patent No. 3,183,989.

Figure 4:
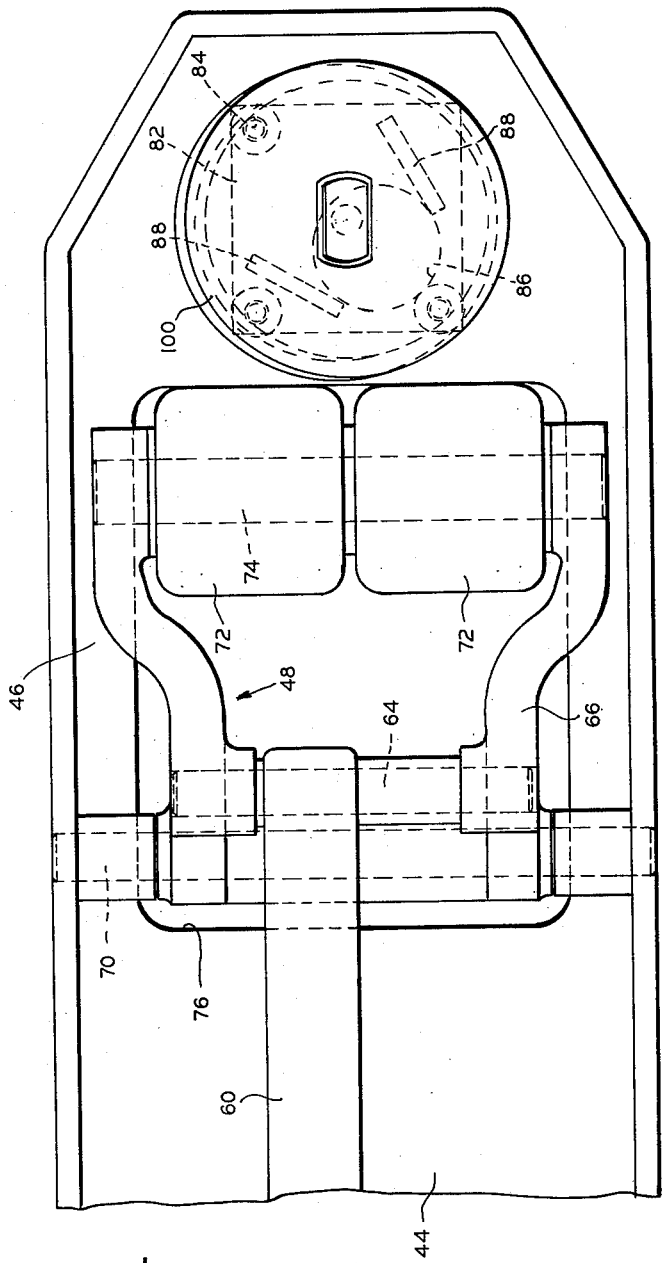
FIGURE 4 is a bottom view taken from beneath the fork arm portion shown in FIG. 3.

Referring now to the improved pallet entry device, identified generally at numeral 80 in FIGS. 6 and 7, it will be understood that one of these devices is mounted in the end portion 46 of each fork arm 44 rearwardly of each lift wheel and linkage assembly 48, although for the purpose of the present description, only the one pallet entry device which is mounted upon the right-hand fork arm, as viewed from the steering or forward end of the truck, is illustrated in the various views. The pallet entry device comprises preferably a square or rectangular mounting plate 82 having three tapped openings 84 therein located adjacent three corners of the mounting plate, an access opening 86 in the mounting plate which is eccentric in relation to the vertical axis of the plate, as best shown in FIGS. 4 and 6, and a pair of mounting block members 88 which are secured, as by welding, at the upper edge portions to the bottom surface of plate 82, and at the lower edges to the upper surface of a wheel disc and bearing assembly 90. Mounting blocks 88 may assume any suitable form and be secured in any convenient manner to the mounting plate and wheel disc and bearing assembly, so long as the planes of the upper and lower edge portions of the mounting blocks form therebetween a predetermined included angle such that when assembled the wheel disc and bearing assembly is disposed at a preselected angle in relation to the mounting plate 82. Then, with the mounting plate disposed in a horizontal plane, the wheel disc and bearing assembly is located at an angle to the horizontal such as is illustrated in FIG. 6 by the angle designed "$\alpha$" in FIG. 6. The pallet entry device associated with the left-hand fork arm 44 is similarly constructed, but with the wheel disc and bearing assembly secured to the mounting plate so as to form an equal and opposite angle $\alpha$ in relation to the showing thereof in FIG. 6.

It should be understood that the manner of mounting the assembly 90 to plate 82 is subject to many variations within the scope of the invention. Also, that the mounting plate 82 may be dispensed with entirely and the wheel disc and bearing assemblies 90 mounted directly from the bottom surface of the fork arms 44, such as by mounting block 88, without the interposition of the mounting plate. It has been found in practice that my pallet entry device is most effective in performing its function if the device is designed such that the angle $\alpha$ is in the range of 11° to 19°, inclusive, and that the optimum angle $\alpha$ is approximately 15°.

In addition, it has been found to be of importance to the optimum functioning of the device that the axis $x$—$x$ of the wheel disc and bearing assembly be also inclined in a fore and aft direction with the upper end of the axis inclined at a predetermined angle in a direction away from the pallet entering end 46 of the fork arm, i.e., in a direction toward the steering end 12 of the truck, this angle being represented in FIG. 3 by the angle designated "$\beta$." In practice it has been found that my pallet entry device functions extremely well when the angle $\beta$ is approximately 7.5°, which angle may be formed in the mounting of the pallet entry device by rotating assembly 90 approximately 45° in a clockwise direction, as viewed from beneath the device, for the entry device to be mounted upon the right-hand fork arm 44, as aforesaid, and in a counterclockwise direction for the entry device to be mounted on the left-hand fork arm, said rotation being in such instance about axis $y$—$y$ while maintaining angle $\alpha$ at 15° and then securing assembly 90 to mounting block 88 in the resulting positional relationship between the latter assembly and mounting plate 82 which thereby locates said latter assembly 90 in a compound angle relationship to the floor or other surface which supports the truck, as best shown in FIGS. 3 and 5.

It will be understood that the foregoing angular relationships are exemplary only of one particularly successful embodiment of my invention, and may be varied within limits to achieve acceptable results. Further, that in practice mounting blocks 88 are constructed of different predetermined lengths, and that scribe marks, or the like, are made in both the mounting plate 82 and the wheel disc and bearing assembly 90 so that the proper angular relationship of the latter assembly is effected merely by securing the mounting blocks 88 at the indicated locations on both the assembly 90 and the mounting plate 82. By proper selection of the location of openings 92 in the rear portions 46 of the fork arms, a connection of each pallet entry device 80 is made to the respective fork arm 44 by means of bolts 94 secured through openings 84 and 92 such that the desired resultant compound angle which presents a predetermined foreshortened dimension of the wheel disc and bearing assembly 90 to the entry space in a pallet device is effected.

I have found that the pallet entry function is most effectively accomplished in the use of as large a disc wheel as possible within the space limitations afforded at the ends of the fork arms rearwardly of lifting wheels 72, and thus have provided disc wheels 100 substantially larger in diameter than lifting wheels 72, contrary to the teaching of U.S. Patent 2,993,703. In fact, with the pallet entry device mounted as aforesaid, most effective results can be obtained in the use of a wheel disc 100 having a diameter which is approximately one and one-half times as large as the diameter of the associated lifting wheels 72.

The foreshortened dimension of the disc and bearing assembly in relation to the entry space in a load bearing pallet is best illustrated in FIG. 3 which shows the rear end portion in section of the right-hand fork arm in relation to different thicknesses of bottom platform pallet boards, illustrated at B1 and B2, with the wheel disc 100 located in a position such that upon further movement of the fork arms towards one or the other of the boards B1 and B2, the board will begin to effect a lifting movement of the fork arm above the surface upon which the truck is operating. In the scale of drawing shown in FIG. 3, the thicknesses of the pallet boards shown represent a range of about ⅜″ to 1″. The upper pallet platform is not illustrated in FIG. 3, but it will be understood that a pocket portion is formed between upper and lower platforms, as previously noted herein. From FIG. 3 it will be appreciated that as the form arms begin to enter the pallet initial contact is established between the leading edge 100′ of the inclined entry wheels and the upper transverse corner of either platform board B1 or B2, it being noted that this leading edge 100′ is at a substantially higher level than trailing edge 100″ of the wheel disc 100. Thus, the lower peripheral surface of each wheel disc presents a rolling inclined plane surface of relatively extremely long obtuse slope, considering the space limitations involved, which eases the climb of the fork arms over the lower pallet board or boards, regardless of pallet board thickness, within certain limitations, and through the entry space of the pallet. It will also be noted that in the use of my construction as shown in the drawings, the wheel discs are sufficiently large and present sufficiently long obtuse slopes for easing the climb of the fork arms over the lower pallet board that a smooth transition is effected between the wheel discs and trail wheels 72 which eliminates the prior necessity for the use of auxiliary camming tracks and the like, mounted intermediate the wheel discs and trail wheels with all the attendant disadvantages thereof as discussed hereinabove. It will be understood that during pallet entry operations each wheel disc 100 and bearing retainer 110 rotate together on bearing means 120 and 122 about axis x—x.

Referring again to the detailed construction of each wheel disc and bearing assembly 90, the use of such a relatively large diameter wheel disc 100 necessitates a bearing structure which minimizes the over-hang or cantilever of the peripheral portion of the wheel disc so that deflection of the wheel disc and mounting structure under the heavy loads imposed along one side thereof during pallet entry operations is minimized. To this end, I have provided a central annular recess 102 in the operative side of the wheel disc 100 which receives the head of a bolt 104 therein. The bolt extends through a central opening 106 in the wheel disc and an aligned opening 108 in a bearing retainer 110 formed as shown in section in FIG. 6 to receive in a recess 114 a portion of a nut 112 which is securely fastened to bolt 104 so that mating surfaces 116 of wheel disc 100 and retainer 110 are engaged in frictional driving relationship to each other and with bolt 104. A fixed annular bearing race 118 is located intermediate the wheel disc and bearing retainer and is fixedly secured to the bottom edge of mounting blocks 88 as aforesaid. The parts are so constructed and arranged with respect to each other that a lower-outer ring of ball bearing members 120, of relatively large dimension, are mounted between bearing race 118 and wheel disc 100, and an upper-inner annular ring of ball bearing members 122, of relatively small dimension, are mounted between the bearing race 118 and retainer 110. Thus, the wheel disc and retainer assembly 100, 110 is mounted for maximum support and relatively frictionless rotation on bearing means 120 and 122, each assembly being supported in its predetermined position on the respective fork arm 44 by mounting blocks 88 and bearing race members 118.

Lubrication for the bearing means 120 and 122 is provided for in the use of passageway 124 in race 118 and the grease fitting 126 connected thereto. Annular passages 128, 130 and 132, shown in FIG. 6, between the various parts of the wheel disc and bearing assembly provide means for lubricating the parts of the assembly. Opening 86 in mounting plate 82 provides access to nut 112 during assembly of the unit.

It will be appreciated by persons skilled in the art that the present wheel disc and bearing assembly provides an extremely large diameter rolling surface in the space available in the use of a wheel disc mounted at a compound angle as previously described, and that the wheel disc is capable of supporting relatively large loads at the outer peripheral portion of the wheel. The bearing construction which I have combined with the wheel disc makes possible the use of such a construction, since ball bearing means 120 has been located near the outer circumference of the wheel disc, thereby affording support in a critical area which minimizes the peripheral overhang of the wheel disc in relation to the location of the annular bearing support thereof.

In view of the above-detailed description, it will now be apparent to persons skilled in the art that all of the advantages of the present invention previously discussed hereinabove, will be realized in the use of my device. It will also be apparent that the invention is subject to many variations in construction and design without departing from the spirit and scope thereof. For example, in addition to variations previously mentioned herein, it should be understood that pallet entry devices 80, mounted as described above, effect an equalization of thrust reaction in opposite directions on opposite sides of the truck during pallet entering operations of the fork arms in that the wheel and bearing assemblies 90 are mounted in right and left-hand relationship at the compound angles as described. As described above in detail herein, the particular mounting of the pallet entry devices 80 will impose inwardly oppositely directly forces on the pallet boards B1 or B2 which will thereby have a tendency to squeeze the pallet boards together. It will, of course, be obvious that the pallet entry devices can be constructed for mounting on opposite ones of the fork arms 44 than as described above so that the wheel discs 100 face outwardly and forwardly of the truck, instead of inwardly and forwardly thereof as shown in the drawings. If so alternatively mounted, the pallet entry devices will operate the same as described above, except that the thrust reaction forces on the lower pallet platform board or boards will act equally outwardly in opposite directions on the pallet boards, tending to spread the pallet boards apart instead of pushing them together. Either mode of mounting of the pallet entry devices 80 may be used as desired with essentially equally advantageous results.

Although I have described and illustrated a preferred embodiment of my invention, it will be understood by those skilled in the art that other modifications, in addition to those exemplary modifications mentioned herein, may be made in the form and arrangement of parts without departing from the spirit and scope of the invention. Accordingly, it should be understood that I intend to cover by the appended claims all such modifications which fall within the scope of my invention.

I claim:
1. In a pallet lift truck having a pair of spaced arms adapted to enter load carrying pallets for lifting and transporting the same and a pair of lifting wheel means pivotably mounted beneath the rearward portions of the respective fork arms, a pallet entry wheel and bearing assembly mounted beneath each fork arm intermediate the adjacent lifting wheel means and the pallet entering end of the fork arm, each said assembly comprising a pallet entry wheel of disc-like form having a diameter at least one and one-half times larger than the diameter of the lifting wheel means and bearing means mounted beneath each fork arm having the entry wheel rotatably assembled therewith, said bearing means including a bearing race secured to the fork arm, a bearing retainer secured to the entry wheel, and bearing elements between the bearing race, the bearing retainer and the entry wheel facilitating rotation of the entry wheel and bearing retainer relative to the bearing race, each said entry wheel and bearing means being mounted at a compound angle beneath each fork and having an axis which is inclined both upwardly, transversely and forwardly relative to the rear pallet entering end of the respective fork arm, said compound angle being determined by the location of the axis of rotation of the entry wheel which forms with a vertical axis two projected angles, one of which angles is greater than 10° and less than 20° in a direction transverse of the truck, and the other of which angles is greater than 5° and less than 10° in a direction longitudinal of the truck.

2. In a pallet lift truck having a pair of spaced fork arms adapted to enter load carrying pallets for lifting and transporting the same and a pair of lifting wheel means pivotably mounted beneath the rearward portions of the fork arms, a pallet entry wheel and bearing assembly mounted beneath each fork arm intermediate the adjacent lifting wheel means and the pallet entering end of the fork arm, each said assembly comprising a pallet wheel of disc-like form having a diameter at least one and one-half times larger than the diameter of the lifting wheel means and bearing means having one of said pallet entry wheels assembled therewith for rotation relative thereto, said bearing means comprising a fixed bearing race mounted fixedly from the fork arm, and annular outer bearing means supporting an outer peripheral portion of the pallet entry wheel from an outer peripheral portion of the bearing race, each said entry wheel and bearing assembly being mounted at a compound angle beneath each fork arm and having an axis which is inclined both upwardly, transversely, and forwardly relative to the rear pallet entering end of the respective fork arm said compound angle being determined by the location of the axis of rotation of the entry wheel which forms with a vertical axis two projected angles, one of which angles is greater than 10° and less than 20° in a direction transverse of the truck, and the other of which angles is greater than 5° and less than 10° in a direction longitudinal of the truck.

3. A pallet truck as claimed in claim 2 wherein each said entry wheel defines a rearwardly upwardly inclined rolling surface of such long obtuse slope and forming with the floor such an acute angle as to ease the climb of the respective fork arm over the lower pallet board to effect a direct transition of support of the fork arm from said entry wheel to the lower peripheral portion of the adjacent lifting wheel under different operating conditions in which the lower pallet board may vary in thickness from approximately ⅜" to 1¼".

4. A pallet truck as claimed in claim 3 wherein said inclined rolling surface of each entry wheel is of such an effective length that the entry wheel is capable of easing the climb of its respective fork arm over lower pallet boards during movement of the truck towards the pallet at a relatively sharp approach angle to the pockets of the pallet which are adapted to receive the fork arms.

5. A pallet lift truck as claimed in claim 2 wherein the open portion beneath the fork arm rearwardly of the adjacent lifting wheel when said lifting wheel is in its lowermost or non-elevated position is not more than 3¼" in height.

6. A pallet lift truck as claimed in claim 5 wherein said open portion beneath the fork arm is approximately 6" in length.

7. A wheel-disc and bearing assembly comprising an upper mounting plate, mounting members secured to and extending beneath said plate, a bearing race secured to said mounting members and forming an angle with the mounting plate of greater than 10° and less than 20°, a rotatable bearing retainer and a wheel-disc supported from said bearing race and forming with said mounting plate substantially the same angle as is formed therewith by said bearing race, upper bearing means intermediate said bearing race and bearing retainer, and lower bearing means intermediate said bearing race and wheel-disc facilitating rotation of the wheel-disc relative to the bearing race.

8. An assembly as claimed in claim 7 wherein said lower bearing means comprises an outer ring of rotatable bearing members intermediate the bearing race and wheel-disc for supporting the wheel-disc near the outer peripheral portion thereof.

9. An assembly as claimed in claim 7 wherein the bearing retainer is rotatably mounted adjacent the upper side of the bearing race, the wheel-disc is rotatably mounted adjacent the lower side of said bearing race, and said bearing retainer and wheel-disc are securely connected to each other for conjoint rotation on the upper and lower bearing means and relative to said bearing race.

10. A wheel-disc and bearing assembly comprising an upper mounting member, mounting means secured to and extending beneath said mounting member, a bearing race integrated with said mounting means and forming a predetermined acute angle with said mounting member, a rotatable bearing retainer and a wheel-disc supported from said bearing race and forming with said mounting member substantially the same angle as is formed therewith by said bearing race, upper bearing means intermediate said bearing race and bearing retainer, and lower bearing means intermediate said bearing race and wheel-disc facilitating rotation of the bearing retainer and wheel-disc relative to the bearing race.

11. In a pallet lift truck having a pair of spaced fork arms adapted to enter load carrying pallets for lifting and transporting the same and a pair of lifting wheel means pivotably mounted beneath the rearward portions of the fork arms, mounting means secured to and extending beneath the respective fork arm intermediate the adjacent lifting wheel means and the pallet entering end of the fork arm, a pallet entry wheel and bearing assembly beneath each fork arm, each said assembly comprising a bearing race integrated with said mounting means, a bearing retainer and a pallet entry wheel of disc-like form having a diameter substantially larger than the diameter of the lifting wheel means supported from the bearing race, and bearing means including rotatable bearing elements forming a bearing support intermediate the pallet entry wheel and the bearing race, said bearing elements being located near the outer peripheral portion of the pallet entry wheel, each said entry wheel and bearing assembly being mounted on said mounting means at a compound angle having an axis which is inclined both upwardly, transversely and forwardly relative to the rear pallet entering end of the respective fork arm so as to provide an entering edge of the entry wheel which defines a rearwardly upwardly inclined rolling surface facilitating entry of the fork arm over lower pallet boards into the pallet.

12. A pallet lift truck as claimed in claim 11 wherein each pallet entry wheel has a diameter at least one and one-half times larger than the diameter of the lifting wheel means and is located at such a compound angle that said inclined entering edge thereof is of such long obtuse slope as to ease the climb of the respective fork arm over the lower pallet board to effect a direct transition of support of the fork arm from said entry wheel to the lower peripheral portion of the adjacent lifting wheel.

13. A pallet truck as claimed in claim 12 wherein said inclined rolling surface has an effective length sufficient to enable the entry wheel to ease the climb of the respective fork arm over pallet boards which may vary in thickness or height above the floor from approximately ⅜" to 1¼".

14. A pallet lift truck as claimed in claim 11 wherein said compound angle is determined by the location of the axis of rotation of the entry wheel which forms with a vertical axis two projected angles, one of which angles is greater than 10° and less than 20° in a direction transverse of the truck, and the other of which angles is greater than 5° and less than 10° in a direction longitudinal of the truck.

15. In a pallet lift truck having a pair of spaced fork arms adapted to enter load carrying pallets for lifting and transporting the same and a pair of lifting wheel means pivotably mounted beneath the rearward portions of the fork arms, a pallet entry wheel and bearing assembly mounted beneath each fork arm intermediate the adjacent lifting wheel means and the pallet entering end of the fork arm, each said assembly comprising a pallet wheel of disc-like form having a diameter at least one and one-half times larger than the diameter of the lifting wheel means and bearing means having one of said pallet entry wheels assembled therewith for rotation relative thereto, said bearing means comprising a fixed bearing race mounted fixedly from the fork arm and annular outer bearing means supporting an outer peripheral portion of the pallet entry wheel from an outer peripheral portion of the bearing race, each said entry wheel and bearing assembly being mounted at a compound angle beneath each fork arm and having an axis which is inclined both upwardly, transversely, and forwardly relative to the rear pallet entering end of the respective fork arm, said compound angle being determined by the location of the axis of rotation of the entry wheel which forms with a vertical axis two projected angles, one of which angles is greater than 10° and less than 20° in a direction transverse of the truck, and the other of which angles is greater than 5° and less than 10° in a direction longitudinal of the truck, the open portion beneath the fork arm rearwardly of the adjacent lifting wheel when said lifting wheel is in its lowermost or non-elevated position being less than 3¼" in height.

References Cited by the Examiner

UNITED STATES PATENTS

| | | | |
|---|---|---|---|
| 1,421,647 | 7/1922 | Wolfs. | |
| 1,975,661 | 10/1934 | Powell. | |
| 2,234,925 | 3/1941 | Hastings | 254—2 |
| 2,274,164 | 2/1942 | Quayle | 254—2 |
| 2,498,504 | 2/1950 | Quayle | 280—43.12 |
| 2,727,752 | 12/1955 | Gold | 280—43.12 |
| 2,920,918 | 1/1960 | Nojima | 16—21 X |
| 2,993,703 | 7/1961 | Paradise | 254—2 X |

KENNETH H. BETTS, *Primary Examiner.*

BENJAMIN HERSH, *Examiner.*